United States Patent
Pappachan et al.

(10) Patent No.: US 12,554,619 B2
(45) Date of Patent: Feb. 17, 2026

(54) SYSTEMS AND METHODS FOR IMPLEMENTING A TRUSTED MULTIPARTY BUILD PROCESS USING CONFIDENTIAL COMPUTING

(71) Applicant: Robert Bosch GmbH, Stuttgart (DE)

(72) Inventors: Pradeep M. Pappachan, Pittsburgh, PA (US); Jorge Guajardo Merchan, Pittsburgh, PA (US); Shalabh Jain, Pittsburgh, PA (US); Sven Trieflinger, Renningen (DE); Michael Fahrafellner, Vienna (AT)

(73) Assignee: Robert Bosch GmbH (DE)

( * ) Notice: Subject to any disclaimer, the term of this patent is extended or adjusted under 35 U.S.C. 154(b) by 174 days.

(21) Appl. No.: 18/593,267

(22) Filed: Mar. 1, 2024

(65) Prior Publication Data
US 2025/0278350 A1    Sep. 4, 2025

(51) Int. Cl.
*G06F 11/3604*    (2025.01)
*H04L 9/08*    (2006.01)

(52) U.S. Cl.
CPC ........ *G06F 11/3612* (2013.01); *H04L 9/0833* (2013.01)

(58) Field of Classification Search
CPC ............................ G06F 11/3612; H04L 9/0833
USPC ....................................................... 380/278
See application file for complete search history.

(56) References Cited

U.S. PATENT DOCUMENTS

| | | | |
|---|---|---|---|
| 10,678,675 B2 | 6/2020 | Silva et al. | |
| 12,010,249 B1* | 6/2024 | Zhang | H04L 9/0897 |
| 2022/0284100 A1* | 9/2022 | Simon | H04L 63/06 |
| 2023/0063743 A1* | 3/2023 | Fay | H04L 9/0861 |

(Continued)

FOREIGN PATENT DOCUMENTS

| | | |
|---|---|---|
| WO | 2019099264 A1 | 5/2019 |
| WO | 2024025744 A1 | 2/2024 |

OTHER PUBLICATIONS

Website https://www.amd.com/content/dam/amd/en/documents/epyc-technical-docs/programmer-references/55766_SEV-KM_API_Specification.pdf "Secure Encrypted Virtualization API Version 0.24." Publication # 55766, Issue Date: Apr. 2020, 122 Pages.

(Continued)

*Primary Examiner* — Michael S McNally
(74) *Attorney, Agent, or Firm* — Dickinson Wright PLLC

(57) ABSTRACT

A method for implementing a multi-party software build process using confidential computing includes encrypting, using one or more secret keys, a disk image of software configured to implement the software build process, storing the one or more secret keys and a key release policy that defines one or more conditions for releasing the one or more secret keys to entities associated with the software build process, and, using hardware configured to support operation of a trusted execution environment (TEE), launching a software environment within the TEE and performing a cryptographic measurement of the software environment, selectively providing the one or more secret keys based on validation of the cryptographic measurement of the software environment and the key release policy, and, using the one or more secret keys for decrypting the disk image, verifying integrity of the disk image, and launching the software build process.

20 Claims, 9 Drawing Sheets

(56) References Cited

U.S. PATENT DOCUMENTS

| | | | | |
|---|---|---|---|---|
| 2023/0128099 A1* | 4/2023 | Nunez Mencias | ...... | G06F 21/53 726/26 |
| 2024/0160717 A1* | 5/2024 | Raghuram | .............. | G06F 21/33 |
| 2024/0428165 A1* | 12/2024 | Hammond | ......... | G06Q 10/0637 |

OTHER PUBLICATIONS

Website https://www.amd.com/content/dam/amd/en/documents/epyc-business-docs/white-papers/SEV-SNP-strengthening-vm-isolation-with-integrity-protection-and-more.pdf "AMD SEV-SNP: Strengthening VM Isolation with Integrity Protection and More." Jan. 2020, 20 Pages.

Website https://confidentialcomputing.io/wp-content/uploads/sites/10/2023/03/CCC-A-Technical-Analysis-of-Confidential-Computing-v1.3_unlocked.pdf "Technical Analysis of Confidential Computing." Nov. 2022, 18 Pages.

Website https://cloud.google.com/security/products/confidential-computing?hl=en "Confidential Computing." Retrieved Jul. 24, 2025, 6 Pages.

Website https://www.intel.com/content/www/us/en/products/docs/accelerator-engines/software-guard-extensions.html "Intel® Software Guard Extensions (Intel® SGX)." Retrieved Jul. 24, 2025, 4 Pages.

Website https://azure.microsoft.com/en-us/solutions/confidential-compute/ "Azure confidential computing, Increase data privacy by protecting data in use." Retrieved Jul. 24, 2025, 5 Pages.

Chao Lin et al., "SecBCS: a secure and privacy-preserving blockchain-based crowdsourcing system." Science China, Information Sciences Mar. 2020, vol. 63, 14 Pages.

Extended European Search Report for EP 25161447.5, Dated Jul. 18, 2025, 9 Pages.

AMD. (n.d.). AMD SEV-SNP: Strengthening VM Isolation with Integrity Protection and More. Retrieved from https://www.amd.com/content/dam/amd/en/documents/epyc-business-docs/white-papers/SEV-SNP-strengthening-vm-isolation-with-integrity-protection-and-more.pdf.

Confidential Computing Consortium. (n.d.). Technical Analysis of Confidential Computing. Retrieved from https://confidentialcomputing.io/wp-content/uploads/sites/10/2023/03/CCC-A-Technical-Analysis-of-Confidential-Computing-v1.3_unlocked.pdf.

Google. (n.d.). Confidential Computing. Retrieved from https://cloud.google.com/confidential-computing.

Intel Corporation. (n.d.). Intel Software Guard Extensions. Retrieved from https://www.intel.com/content/www/us/en/architecture-and-technology/software-guard-extensions.html.

Microsoft Corporation. (n.d.). Azure Confidential Computing. Retrieved from https://azure.microsoft.com/en-us/solutions/confidential-compute/.

* cited by examiner

SYSTEMS AND METHODS FOR IMPLEMENTING A TRUSTED MULTIPARTY BUILD PROCESS USING CONFIDENTIAL COMPUTING

TECHNICAL FIELD

The present disclosure relates to distributed software integration and build processes.

BACKGROUND

Distributed software integration and build processes may involve multiple entities/parties independently developing and testing respective portions (e.g., software modules) of a software application and then integrating the various software modules to build the application. For example, in the automotive industry, original equipment manufacturers (OEMs) and suppliers may collaborate to develop software applications that are executed on embedded systems inside vehicles. This model of collaboration may include each entity separately developing and testing some portion of the software application to defined specifications (e.g., respective requirements, application program interface (API) specifications, etc.) and eventually integrating the various software portions before final testing and implementation.

SUMMARY

A method for implementing a multi-party software build process using confidential computing includes encrypting, using one or more secret keys, a disk image of software configured to implement the software build process, storing the one or more secret keys and a key release policy that defines one or more conditions for releasing the one or more secret keys to entities associated with the software build process, and, using hardware configured to support operation of a trusted execution environment (TEE), launching a software environment within the TEE and performing a cryptographic measurement of the software environment, selectively providing the one or more secret keys based on validation of the cryptographic measurement of the software environment and the key release policy, and, using the one or more secret keys for decrypting the disk image, verifying integrity of the disk image, and launching the software build process.

Other embodiments include systems, one or more processors or processing devices, or other circuitry configured to implement functions corresponding to the principles of the present disclosure.

DETAILED DESCRIPTION

Figure 1A:
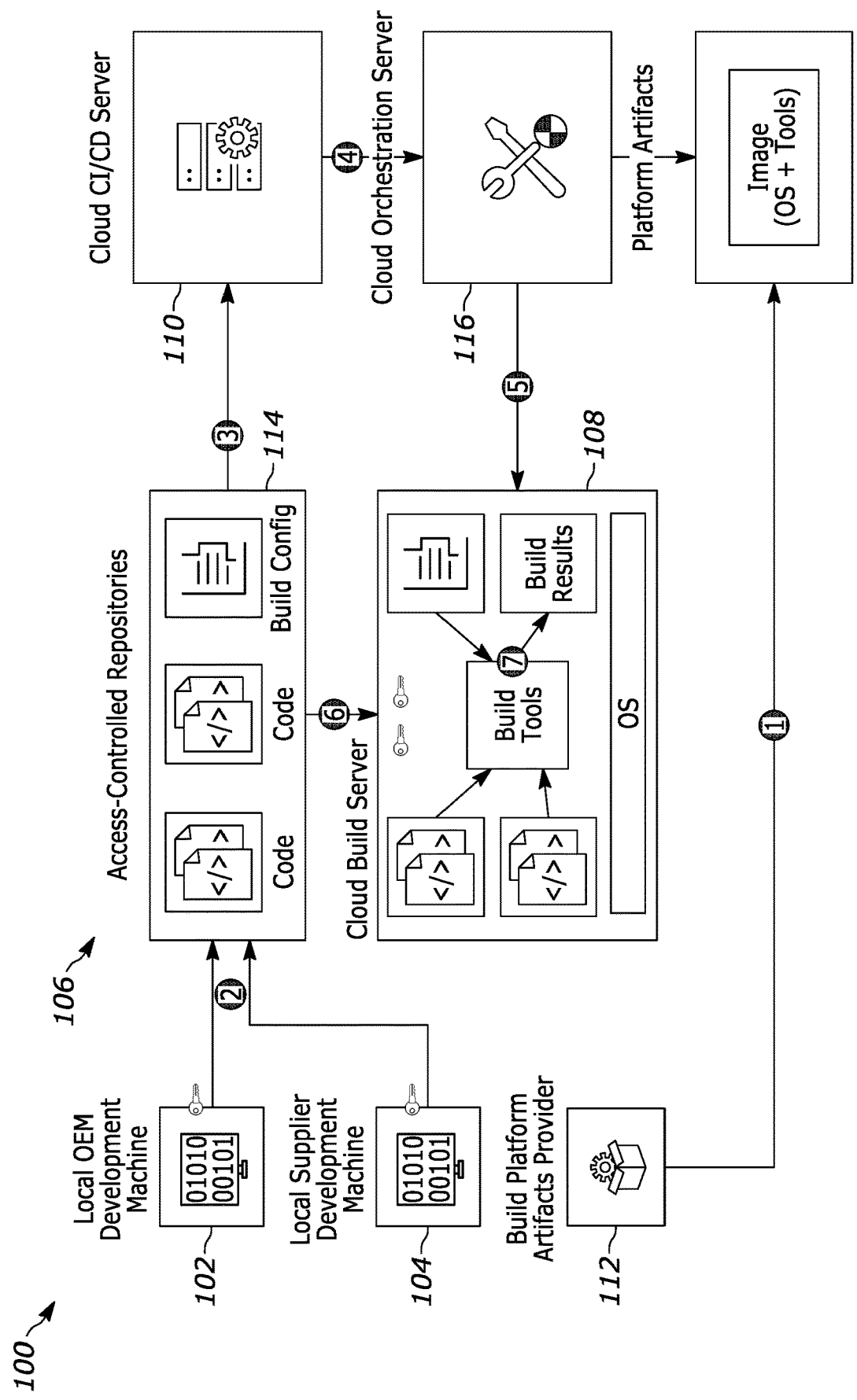
FIG. 1A illustrates an example distributed software integration and build system that involves multiple entities independently developing and testing parts of a software application, and then integrating and testing the application (e.g., in a cloud computing system)

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Distributed software integrations and build processes may involve multiple entities independently developing and testing respective portions (e.g., software modules) of a software application and then integrating the various software modules to build the application. For example, in the automotive industry, original equipment manufacturers (OEMs) and suppliers may collaborate to develop software applications that are executed on embedded systems inside vehicles. This model of collaboration may include each entity separately developing and testing some portion of the software application to defined specifications (e.g., respective requirements, application program interface (API) specifications, etc.) and eventually integrating the various software portions before final testing and implementation.

In some examples of distributed software integration, a "Shift Left" approach may be implemented to increase efficiency and reduce costs. In a Shift Left implementation, various software modules are integrated and tested earlier in the development process to reduce the time-to-market and discover defects earlier. Such practices (continuous integration/continuous delivery) have already been adopted for several years in the general software industry. However, a major obstacle to the implementation of such processes in collaborative settings is the sharing of confidential intellectual property (IP) inside the software modules between mutually distrustful entities (e.g., OEMs and suppliers).

Distributed software integration systems and methods according to the present disclosure implement a trusted, distributed build process using confidential computing technologies (e.g., technologies configured to protect data during processing in one or more remote and/or separate computing devices, such as in a cloud computing system, one or more remote servers, etc.). By providing strong assurances for the protection of OEM and supplier IP, this method enables the use of continuous build and integration processes for automotive use cases (and similar settings where multiple entities collaboratively work on artifacts that are comprised of elements coming from these entities but must not be disclosed to each other).

FIG. 1A illustrates an example distributed software integration and build system 100 that involves multiple entities independently developing and testing parts of a software application (e.g., built to some specifications) and then integrating the various software modules to build the application. The system 100 shown in FIG. 1A is only one example implementation of a distributed software integration and build system. In FIG. 1A, the system 100 is shown with two entities: an OEM and a supplier (e.g., corresponding, respectively, to at least one OEM development machine 102 and one supplier development machine 104) that collaborate to build a software application, with each entity developing specific software modules independently before they are integrated with other modules into a single application. Since each entity independently develops certain software modules, the entities use their own machines for development and to store source code and configurations in version-controlled repositories.

In order to integrate the independently developed software modules, the source code is pulled from the various repositories, along with the configuration files that specify how the modules must be built and linked together to generate the software application. In a Continuous Integration/Continuous Delivery (CI/CD) environment, a server is notified when code is checked into the repository. Upon receiving the notification, the CI/CD server launches the build process. The build process pulls source code and configuration files from the repository and initiates the build. Developers are then notified about the status of the build, along with any artifacts like build logs that are generated during the process.

The build process is implemented with a cloud computing system 106. The machine that hosts the build process (e.g., a cloud build server 108) and the CI/CD server 110 are in the cloud computing system 106. In an example, a build platform artifacts provider 112 generates and uploads (as shown at 1) the image of the operating system (OS) and the build tools that will be run on the build server 108. The one or more entities check source code into corresponding repositories 114 (as shown at 2). The CI/CD server 110 is notified of new source code checked into the repositories (as shown at 3). The CI/CI server 110 requests (as shown at 4) an orchestration server 116 to launch the build server 108 (e.g., in a cloud virtual machine; as shown at 5). The build server 108 boots the OS from the image provided by the artifacts provider 112. The build process uses the credentials to access and read the source code and configuration files from the repositories 114 of the two entities (as shown at 6). Once the files have been downloaded to the build server 108, the build is initiated. At the end of the build process, the results of the build are transferred to the stakeholder entities (as shown at 7).

Figure 1B:
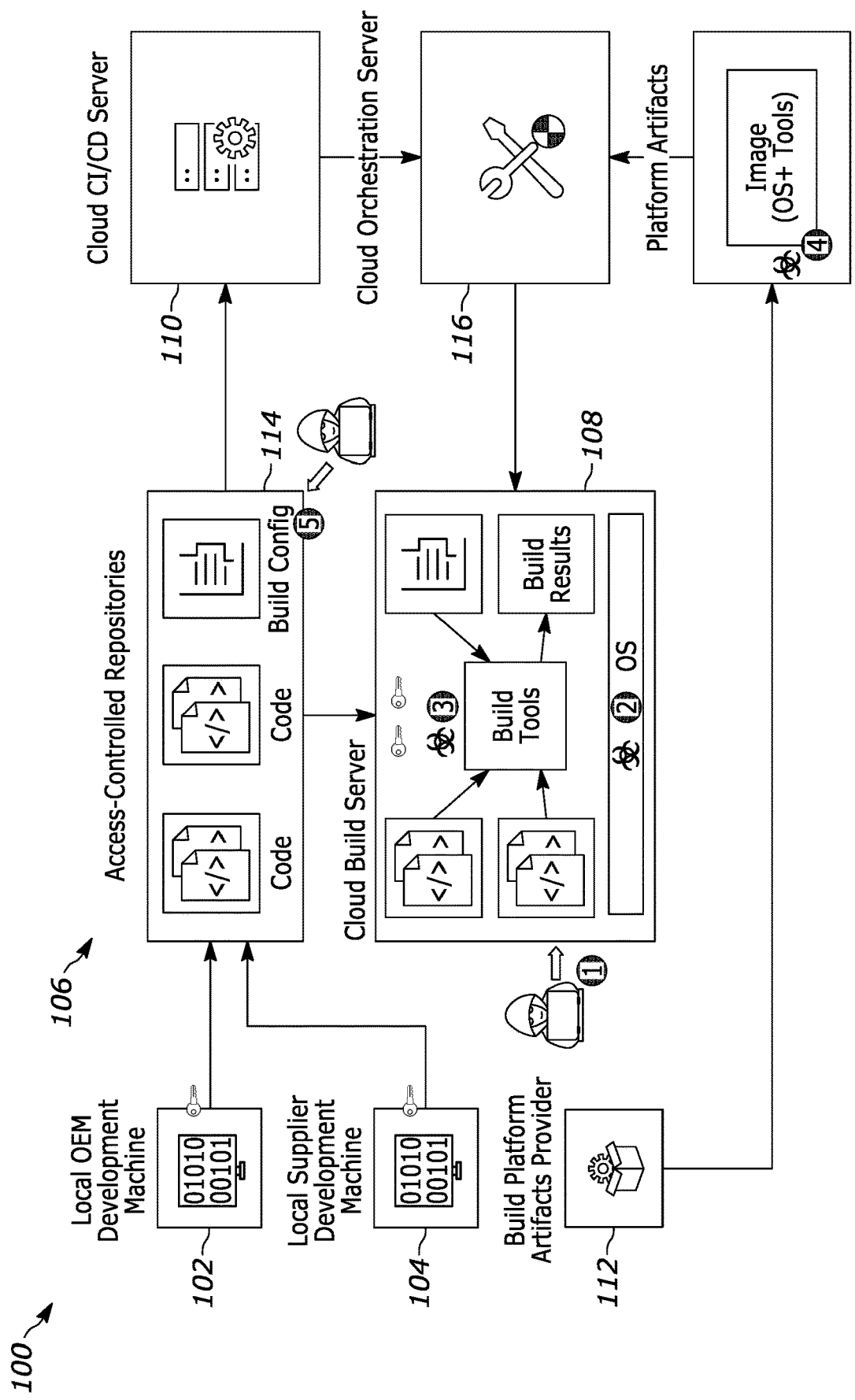
FIG. 1B illustrates various potential security threats to the system of FIG. 1A.

FIG. 1B illustrates various potential security threats to the system 100. For example:
- an adversary with sufficient privileges can gain unauthorized access to the build server 108 or launch a man-in-the-middle (MITM) attack from an untrusted platform to steal secrets (keys, IP in source code, etc.) as shown at 1;
- an adversary can use privileged system software (e.g., hypervisor, also known as a virtual machine monitor) in the build server software stack to exfiltrate IP (source code, log files) from the build server 108 as shown at 2;
- an adversary can use privileged system software (e.g., hypervisor) in the build server software stack to steal access credentials for the code repositories 114 as shown at 3;
- by gaining access to the build server artifacts (OS image), the adversary can inject vulnerabilities into the build server artifacts to steal IP and secrets during build time as shown at 4; and
- an adversary can exploit vulnerabilities on the code repository machines as shown at 5.

The primary security objective of a trusted, distributed build process is to protect the IP in the source code that belongs to the various entities (OEM, suppliers). The following security requirements (SR) are needed in order to protect the IP from the threats described above:
- SR1: Even highly privileged entities are prevented from accessing the source code, build artifacts and secrets during build execution on the build server 108. (Threat #1)
- SR2: The IP owners (OEM and suppliers) are provided strong (e.g., cryptographic) assurances that their IP will only be hosted on a trusted platform during the build process. (MITM Threat #1)
- SR3: No exfiltration of secrets are permitted during build execution from the build server 108. (Threats #2, #3)
- SR4: The integrity of the build platform artifacts (e.g., OS, build tools) shall be protected at all times (at rest, during transit, and in execution). (Threat #4)
- SR5: The IP owners (OEM and suppliers) are provided strong (e.g., cryptographic) assurances that their IP (e.g., application source code) will only be hosted in access-controlled code repositories on a trusted platform. (Threat #5)

Figure 2A:
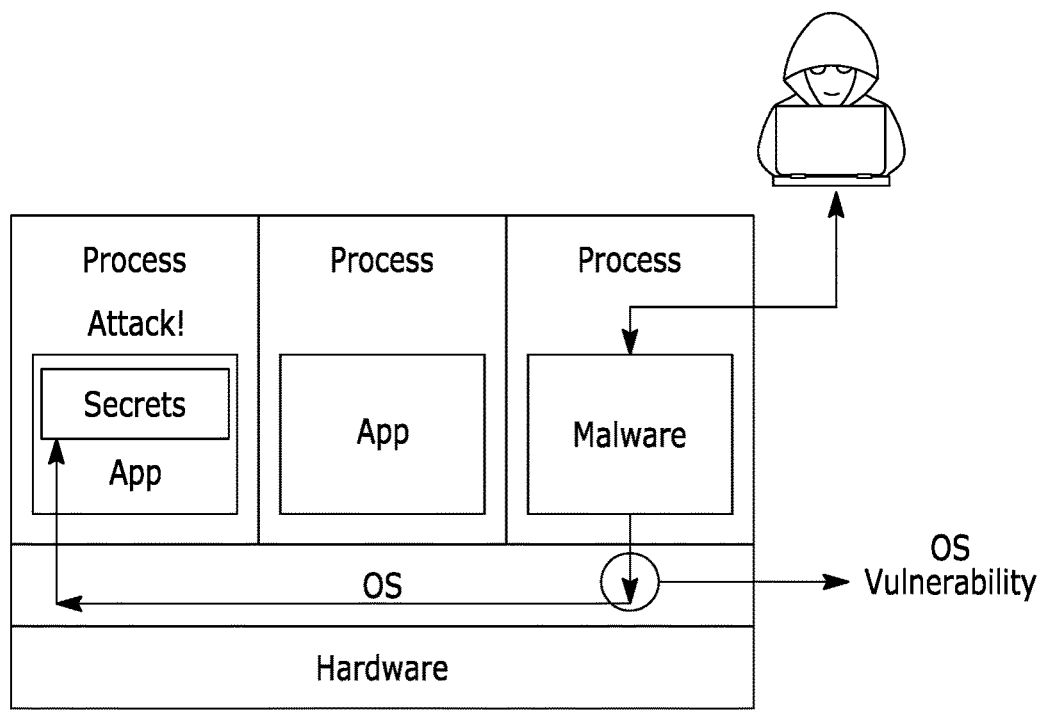
FIGS. 2A, 2B, and 2C generally illustrate principles of confidential computing using Trusted Execution Environments (TEEs)
Figure 2B:
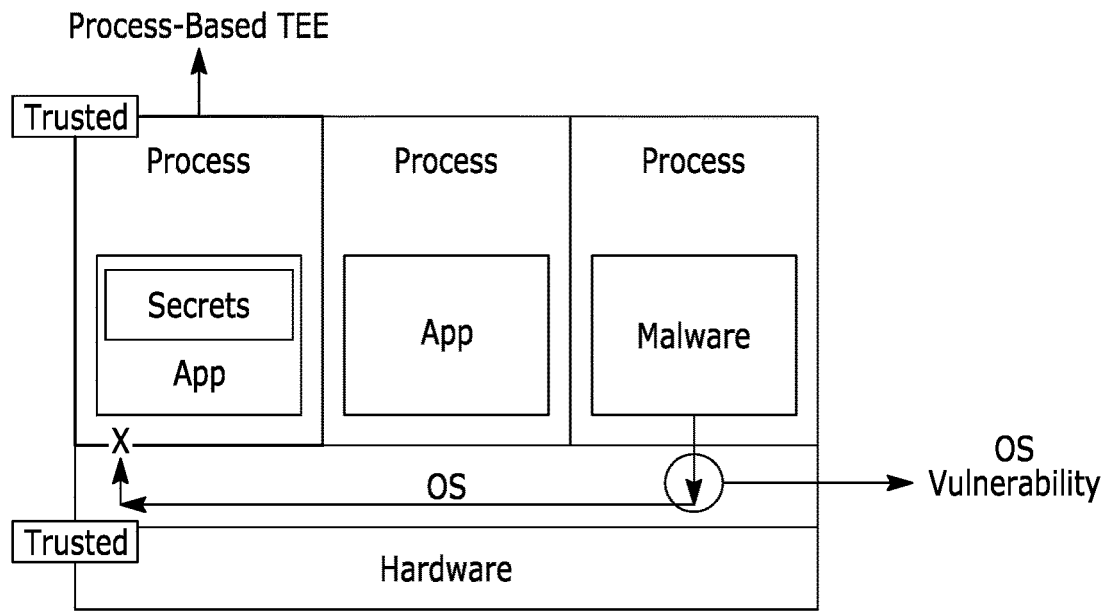
Figure 2C:
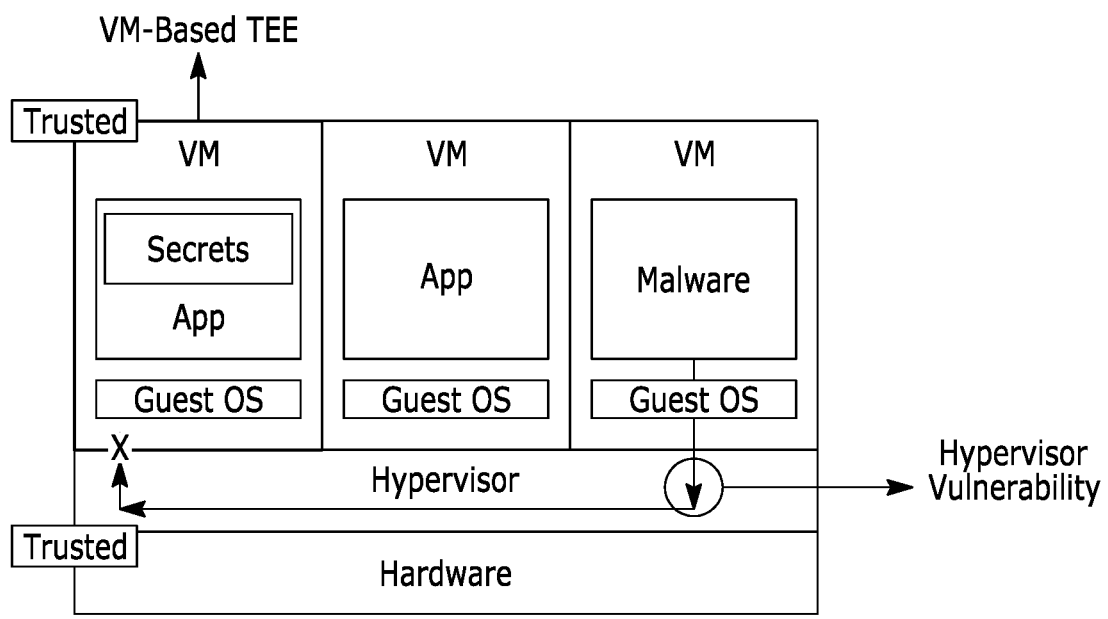

FIGS. 2A, 2B, and 2C generally illustrate principles of confidential computing. Typically, security measures for protecting the code and data of an application have focused on protecting their confidentiality at rest (disk encryption) and in transit (network encryption). However, it is possible for an attacker to access and modify code and data during use as well. As shown in FIG. 2A, an attacker might exploit vulnerabilities in privileged system software (e.g., OS, hypervisor) to gain access to the secrets of an application. Confidential computing implements technologies that use the notion of a Trusted Execution Environment (TEE) to protect the confidentiality and integrity of code and data in a machine's memory using hardware security features, even from privileged system software on the platform.

FIGS. 2B and 2C show example types of TEE technologies: a process-based TEE (in FIG. 2B) and virtual machine (VM)-based TEE (in FIG. 2C). In each type of TEE, the platform hardware protects a region of memory using encryption. The encryption key is unique to each region that must be protected and is only available to hardware (e.g., is not available to privileged system software, such as BIOS, hypervisor, or the OS). Therefore, the TEE memory is not accessible through the threat vector described above. In the case of a process-based TEE, the region of memory protected by encryption encompasses part of a process' memory (e.g., the part of memory where sensitive code and data reside). In a VM-based TEE, the region of memory protected encompasses the entire memory of the virtual machine. As used herein, functions performed within and/or by a virtual machine may correspond to functions performed within an isolated container implemented by a virtual machine.

In addition to TEEs, another part of confidential computing is remote attestation. Attestation is the process of demonstrating to a verification entity that an application is running on a machine with a TEE and that the identity of the application is what the verification entity expects it to be. The verification entity is interested in the attestation statement so that it can provision the application with secrets necessary for the application to run upon successful attestation. For example, a movie streaming service can provision a movie decryption key to a movie player (to protect against stealing of movie content by unauthorized entities) running on a remote machine if the player can present the movie streaming service with an attestation report that proves that the movie player is running in a TEE and that the movie player is the application it claims to be. The attestation report comes from the hardware (CPU) on the platform. The attestation report is a hardware-signed statement that includes, among other things, the measurement (e.g., cryptographic hash) of the code and data of the application that is initially loaded into the TEE (e.g., the cryptographic hash of a piece of code and/or data is unique with extremely high probability).

Generally, in the attestation process, the keys used by the system to attest are held by a security co-processor (e.g., an ARM processor in a system-on-a-chip (SoC)) and are not accessible by the system software. The security of the VMs running on top of the hypervisor is guaranteed via encryption of all memory used by the VM. The encryption/decryption takes place directly in the on-die memory controllers. Each page table entry has a special status bit, which controls whether or not the associated page is encrypted. Each VM can use a different key that is managed by the security co-processor and is not accessible by the hypervisor. Accordingly, the hypervisor does not need to be trusted and the VMs can be completely independent of each other (e.g., one unique key for each VM). The root-of-trust behind the TEE, such as Secure encrypted virtualization (SEV) hardware or circuitry from a CPU vendor like AMD, measures the VM that runs on top of the hypervisor.

In an example it may be assumed that the initial code image of the VM is encrypted and the integrity of the initial code image needs to be proven to the guest owner. In this manner, secret data can be loaded to the VM without leaking the data to the hypervisor. In some examples, securely attesting a guest VM from the hypervisor host itself may not be possible since the goal of the attestation process is to detect whether the hypervisor is malicious (depending on the security model). Whether the hypervisor is trusted depends on the security model and the particular technology. For example, in SEV-SNP (secure nested paging) systems, the hypervisor is not at all trusted. However, in SEV-ES (encrypted state) systems, the hypervisor is not fully trusted (though not assumed to be malicious) since such systems themselves may have exploitable vulnerabilities.

While SEV and SEV-ES systems only support attestation during guest launch, SEV-SNP supports more flexible attestation. Attestation reports can be requested through a protected path from a secure processor (SP) by the guest VM at any time. As part of SEV-SNP VM launch, a set of private communication keys are created by the SP which the guest can use to communicate directly with the SP. The guest can use this path to request attestation reports, cryptographic keys, and more. In some implementations these keys and their use and management may be done via a virtual TEE that is installed as part of the guest VM.

However, if the VM is to be provisioned with secrets after successful attestation, a virtual TEE may or may not be implemented. For example, a virtual TEE implemented in the guest may be provisioned with the ability to generate the required secrets. The virtual TEE, upon verifying the attestation report from the platform, releases the secrets. This has the advantage of not requiring interaction with an external third party but does require the instantiation of the virtual TEE and some process to provision the virtual TEE with the ability to generate the needed secrets.

Alternatively, if no virtual TEE is implemented, the platform performs attestation and connects to a remote trusted third party that acts as a verifier. This remote trusted third party verifies the attestation report and upon success releases the needed secrets to the platform. The virtual TEE essentially instantiates the verifier inside the guest VM.

Besides remote attestation and the protection provided by a virtual TEE, SEV-SNP systems support additional use models for generating guest key material. SEV-SNP VMs may request keys directly from the SP for various purposes, such as data sealing. These keys may be derived from different sources, and the VM may select which sources are used as needed for their use case. For instance, local sealing keys can be requested which are specific to the current part at a certain trusted computing base (TCB) level and specific to the individual developer (IDB) signing key (e.g., the IDB or identity block is supplied by the guest owner and is associated with a particular VM). The IDB signing key contains fields that allow the guest owner to uniquely identify the VM and contains the expected launch digest. The IDB can only be used to communicate upon successful attestation of the VM's public key information, which later can be used by a third party to establish a secure channel with the VM. The IDB can only be associated with VMs that match the expected launch digest and is included as part of the attestation report. Through these controls, the VM may request keys that are guaranteed to not be able to be derived by a malicious actor or another device. In these examples, a virtual TEE may not be required. The keys that are requested can be used to encrypt code or to set up a secure channel with a code repository. However, in these examples, there may still be a need for a third party that verifies the attestation report and accepts the VM's public key. Although described with respect to SEV architecture, these principles may similarly apply to other types of systems, such as Intel® trust domain extensions (TDX) systems. For example, instead of the SEV-SNP SP generating keys or signing attestation reports, a special quoting enclave may perform these operations.

In some examples, guest VMs may be required to ensure that rest data (e.g., data not being stored in memory) is encrypted by other means, such as full disk encryption, as neither TDX nor SEV-SNP systems address the protection of such data.

Various entities may have access to, interact with, and control aspects of a distributed software integration system and may be associated with different levels of trust and security. For example, the hardware platform (e.g., the hardware platform implementing the confidential computing TEE) is a trusted entity. Physical access to the hardware platform by the cloud provider may be possible.

The cloud provider provides the infrastructure to the entities providing the code (e.g., developer entities, such as OEM and one or more supplier entities, in an example) and hosts the cloud build server. Generally, the cloud provider is not a trusted entity, but has physical access to the hardware platform, and owns and is in complete control of the computer infrastructure and hypervisor that runs on the hardware.

The developer entities provide respective portions of the software and, in some examples, the configuration used to build the overall application. Typically, the developer entities only trust their own infrastructure (e.g., the source repository server for a respective developer entity).

In various examples, the build platform artifacts provider may be set up and/or operated by one of the developer entities or a trusted third party provider. In some examples, the build platform artifacts provider may have an open source implementation to allow verification by various other entities.

The cloud orchestration server may be associated with an untrusted third party but may be set up and/or operated by the cloud provider.

Distributed software integration systems and methods according to the present disclosure as described below in more detail are configured to implement a trusted, distributed build process using confidential computing technologies. The systems and methods described herein provide a trusted, distributed, continuous integration/build process for applications (e.g., (automotive applications, industrial applications, etc.) involving source code (IP) from multiple, mutually distrustful entities. The build artifacts and process are protected during at rest, in transit, and during execution in a public cloud computing system/server. Provably strong (e.g., cryptographic) assurances are provided to IP owners that their IP is only hosted on trusted platforms and that their secrets cannot be exfiltrated from the platforms. Multiple entities are able to efficiently integrate respective code to build complex software applications in an automated manner without compromising valuable IP. Further, the overhead associated with integrating code from distributed sources is reduced, saving time and money. Previously, developer entities such as OEMs and suppliers would have to resort to time-consuming methods to integrate their software due to IP leakage concerns.

Figure 3:
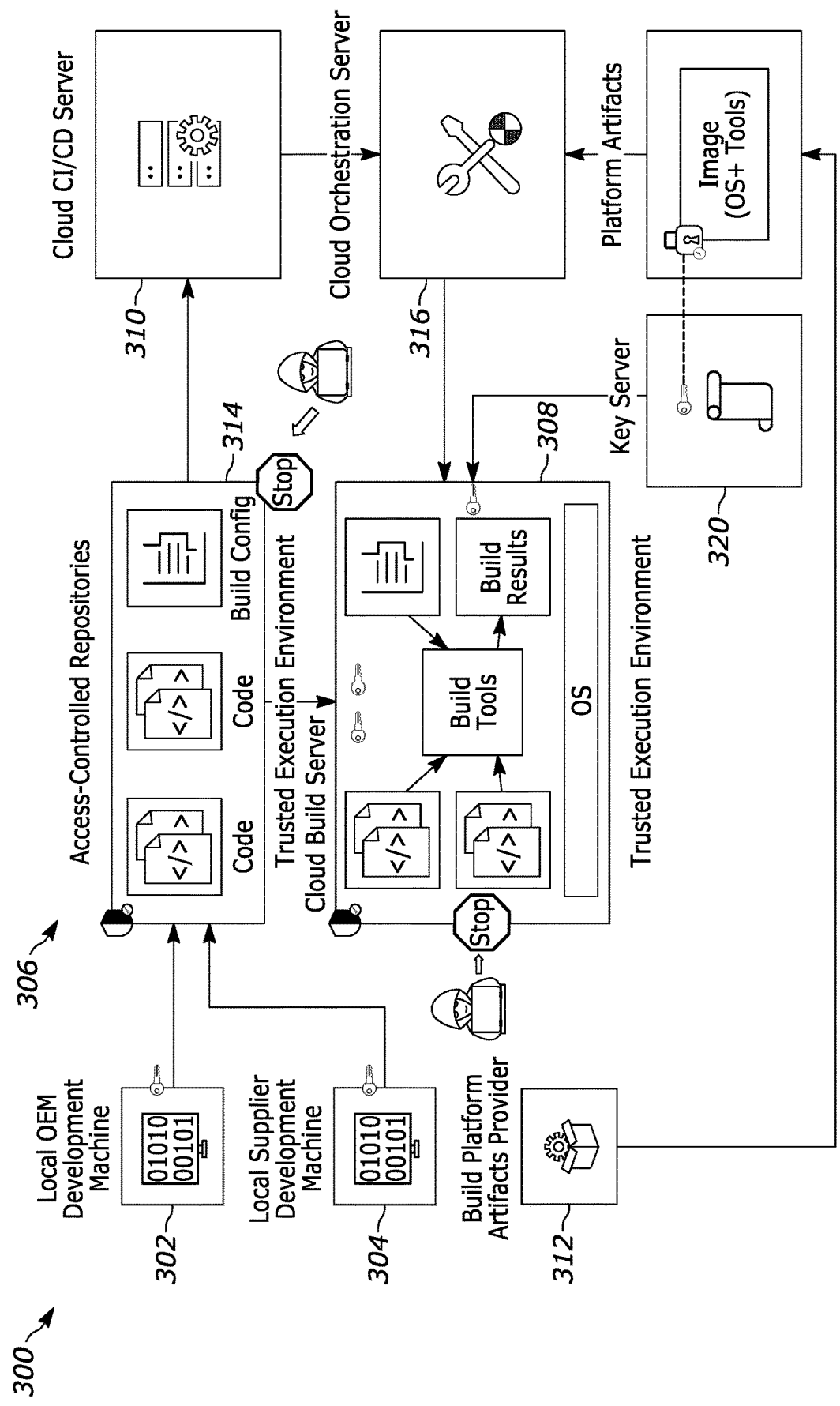
FIG. 3 illustrates an example distributed software integration and build system according to the principles of the present disclosure using TEEs.

FIG. 3 illustrates an example distributed software integration and build system 300 according to the principles of the present disclosure. The system 300 shown in FIG. 3 is only one example implementation of a distributed software integration and build system configured according to the principles of the present disclosure. As an example, the system 300 is described as a modification of the system 100 of FIG. 1A.

In FIG. 3, the system 300 is shown with two entities: an OEM and a supplier (e.g., corresponding, respectively, to at least one OEM development machine 302 and one supplier development machine 304). Similar to FIG. 1A, the system 300 includes a cloud computing system 306 that implements a cloud build server 308 and a CI/CD server 310. A build platform artifacts provider 312 generates and uploads the image of the operating system (OS) and the build tools that will be run on the build server 308. The one or more entities check source code into corresponding repositories (i.e., code repositories) 314. The CI/CI server 310 requests an orchestration server 316 (which, in some examples, may be implemented by/within the cloud computing system 306) to launch the build server 308 (e.g., in a cloud virtual machine). The build server 308 boots the OS from the image provided by the build platform artifacts provider 312. The build process uses the credentials to access and read the source code and configuration files from the repositories 314 of the two entities. Once the files have been downloaded to the build server 308, the build is initiated.

In contrast to the system 100 of FIG. 1A, at least the cloud build server 308, the repositories 314, and the Key Management Server 320 are implemented using confidential computing systems configured to execute a hardware trusted execution environment (e.g., a VM-based TEE such as the SEV-SNP, TDX, etc. systems described above). By hosting data elements such as sensitive IP (e.g., source code) and secrets (e.g., access control credentials) in a TEE, these data elements are protected during execution. Typically, even privileged adversaries or system software (e.g., hypervisor, host OS) cannot read or modify sensitive data inside a TEE.

The VM-based TEEs start through a secure and measured boot process that measures every software component that is launched (VM firmware, VM OS, attestation agent, etc.). Through remote attestation (as described below in more detail), the owners of the source code (e.g., the developer entities) involved in the build process are provided with strong assurances that their IP is protected on a trusted platform. This assurance is delivered in the form of an attestation report to the developer entities that proves that the hosting machine has a hardware-supported TEE, and that the software components launched on the TEE are exactly the ones intended to be launched. This requirement is met by including measurements of the software recorded by a trusted platform module (TPM) or any of the alternative (hardware) implementations in the report and subsequent comparison of the measurements to those performed during a registration process (e.g., a developer entity can compare relevant portions of the measurements to a hash of an expected image created or known by the developer entity). In some examples, other secure hardware devices may be used instead of a TPM (which is a separate hardware device).

If the attestation process is successful, the owners can provision secrets that are necessary to initiate the build process on the build server 308. For example, the owners/developers can securely provision the access credentials required to pull the source code from their respective repositories 314 and upload to the build server 308, following which the build process can be initiated. After the build process is complete, the results of the build can be filtered to inhibit leakage of sensitive information (e.g., from a compiler or linker output) and securely returned to the developer entities. In some examples, when the VM of the build server 308 is shut down, all the secrets contained in memory of the build server 308 (e.g., source code, keys, etc.) are purged and no longer accessible to any entity. This purge may not necessarily occur only in response to the VM being shut down and may also be implemented as a part of the build process, which may require all locally downloaded source code to be erased once the build process has finalized.

The software components (OS, build tools) that are launched on the build server 308 are uploaded (e.g., in the form of a cryptographically protected image) to the cloud computing system 306 by the build platform artifacts provider. The customer key used to protect the image is managed by a trusted key management server 320 and only released if it can be proved that the build server 308 meets the TEE requirements of the various developer entities. This can be guaranteed via a combination of standard access control for the trusted key management server 320 and remote attestation of the build server 308 to the trusted key management server 320. In various examples, the key management server 320 is implemented in the cloud computing system 306, a separate server, by one of the developer entities, etc.

Figure 4:
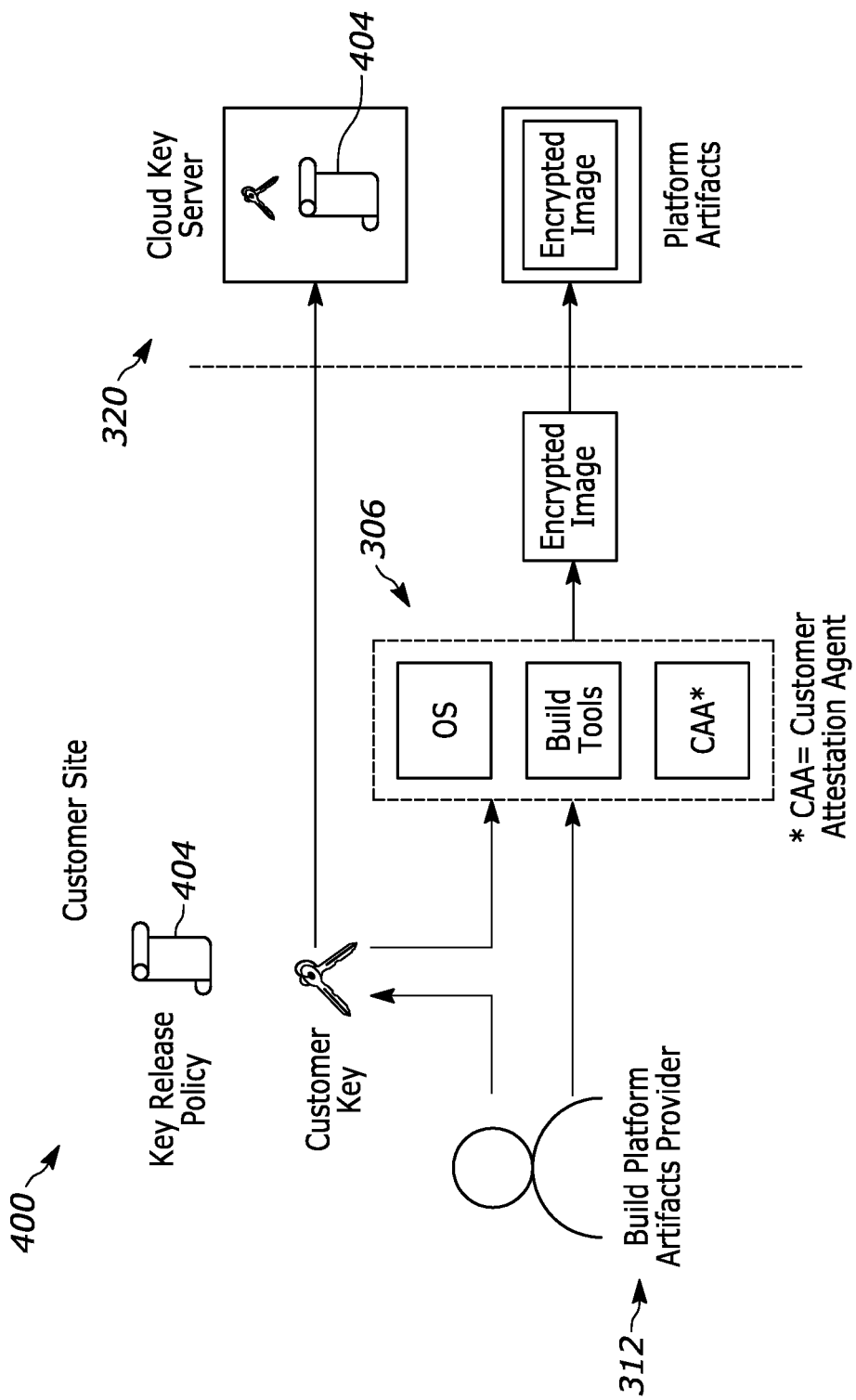
FIG. 4 illustrates one example setup process implemented to set up the system of FIG. 3 using a key management server according to the principles of the present disclosure.

FIG. 4 illustrates one example setup process 400 implemented to set up the system 300 (e.g., to build software artifacts, etc.) using the key management server 320. In this example, software artifacts that will run on the build server 308 may be prepared prior to being uploaded to the cloud computing system 306. The integrity of the build platform artifacts, such as the OS, runtime configuration of the system, the customer attestation agent (CAA), and the build tools, are protected cryptographically by the build platform artifacts provider 312. The build platform artifacts provider 312 encrypts and integrity-protects a disk image of the software using one or more secret keys (e.g., respective, different keys for encryption and integrity protection) and uploads the image to the cloud computing system 306. The orchestration server 316 uses the encrypted image to launch the VM on the TEE platform (e.g., the TEE platform implemented by the build server 308). The one or more keys used to decrypt and verify the integrity of the image are securely stored on the trusted key management server 320, along with a key release policy 404 that defines one or more conditions under which the key will be released to various entities. In an example, the decryption key and/or the integrity protection key are only released to the firmware on the build server 308 in response to providing a boot attestation report that proves to the key management server 320 that the customer policies regarding the TEE of the build server 308 and the VM firmware (as defined in the key release policy 404) are satisfied. For example, in the key release policy 404, a developer entity may specify that the build server 308 must implement a TEE, support a specific TEE (e.g., a specific TEE from a specific CPU or other hardware vendor/manufacturer), etc., and also specify the version of the firmware that launches the OS in the VM. Alternatively, the image can contain a specification of the build tools to be used, including, for example, a location where the tools may be obtained (e.g., a URL where the tool can be downloaded), along with public keys used to verify the downloaded tool binaries or source code that has been signed using the respective private key by a tool vendor or publisher.

In an example, a key used to encrypt the OS and the build platform artifacts may be generated by the build platform artifacts provider 312 and uploaded to the key management server 320. The key management server 320 only releases the key once the attestation report is verified as complying with the one or more security policies provided by respective developer entities. This assumes that the key management server 320 (e.g., as operated by a cloud computing system provider) does not subsequently cooperate with the build platform artifacts provider 312. For example, the key management server 320 may reach an agreement with the build platform artifacts provider 312 to release the key if the attestation report contains a slightly modified version of the policy originally provided by a corresponding developer entity.

In another example, instead of the build platform artifacts provider 312 encrypting and authenticating the image and uploading the image to the cloud computing system 306, the build platform artifacts provider 312 provides the image to one of the developer entities for encryption. In this example, other entities (e.g., other developer entities) are required to trust that the corresponding developer entity has not maliciously modified the image.

In still another example, instead of the build platform artifacts provider 312 encrypting and authenticating the image and uploading the image to the cloud computing system 306, the build platform artifacts provider 312 publishes the image to all entities involved system 300. In this manner, each entity can independently verify whether the image is as expected and contains no malicious artifacts.

In other examples, a trusted third party entity (e.g., an entity other than a customer/OEM developer entity, a supplier developer entity, etc.) performs one or more portions of a setup process, such as the setup process 400. For example, a hash of the policy compliant software running on the build server 308 may be used as described below. The build platform artifacts provider 312 computes a hash of the disk image to be used in the build server 308. Before generating the keys used to encrypt and authenticate the software, the build platform artifacts provider 312 derives the keys as follows, in one example:

The build platform artifacts provider 312 computes the hash of the disk image to be used in the build server and stores the hash (e.g., as a value Hd). In some examples, Hd may be verifiable by other entities, in which case the disk image may not need to be confidentially stored but only be authenticated (i.e., by verifying the integrity of the disk image). The build platform artifacts provider 312 generates a random seed S using a (e.g., true) random number generator. The build platform artifacts provider 312 generates an encryption key using a key derivation function KDEV that receives as input the seed S and several strings as follows: Ke←KDEV(S, Hd, encrypt, algorithm-identifier, 0, additional-optional-strings). The build platform artifacts provider 312 generates a MAC key for integrity protection using a key derivation function KDEV that receives as input the seed S and several strings as follows: Km←KDEV(S, Hd, mac, algorithm-identifier, 1, additional-optional-strings). The build platform artifacts provider 312 performs authenticated-encryption of a portion of the disk image to be included in the build server 308 and place the portion of the disk image in encrypted form for future use. The build platform artifacts provider 312 makes the keys available to the Confidential VM (CVM). This can be done via the key management server 320 and/or by uploading the keys to a particular CVM by establishing a secure channel between the platform and the build platform artifacts provider 312 and executing only after an initial launch command that verifies the initial integrity of a guest firmware. Alternatively, a LAUNCH_SECRET command may be implemented that allows a guest to inject a secret that can be used later by the guest to perform operations on encrypted data.

As described above in the example strings, a comma indicates that the strings are concatenated and "algorithm-identifier" refers to a string used to identify the algorithm being used. The "additional-optional-strings" refer to additional information that can be used to include in the key derivation function. One advantage of using such a key derivation method is that if the build image has been modified, the key used to encrypt and authenticate the image will be different and thus during decryption and verification, either one or both will fail. In this manner, the integrity and correctness of the environment are implicitly checked without requiring any semantic processing of a security policy.

As described above, there is an implicit assumption that the software to be included in the build server 308 has been vetted by all entities involved in the system and, in particular, by a customer (e.g., the OEM developer entity). Further, it may be desirable that the environment is verifiable by the customer. Otherwise, the build platform artifacts provider 312 can provide a "malicious" environment that leaks secret information/data to unauthorized third party entities. If the customer creates the environment, the customer is in complete control but this is not likely to be the case in practice. For example, often the customer will make use of a service and the service provider creates/provides the environment. Accordingly, the service provider could allow the image to be inspected/vetted by the customer.

Figure 5:
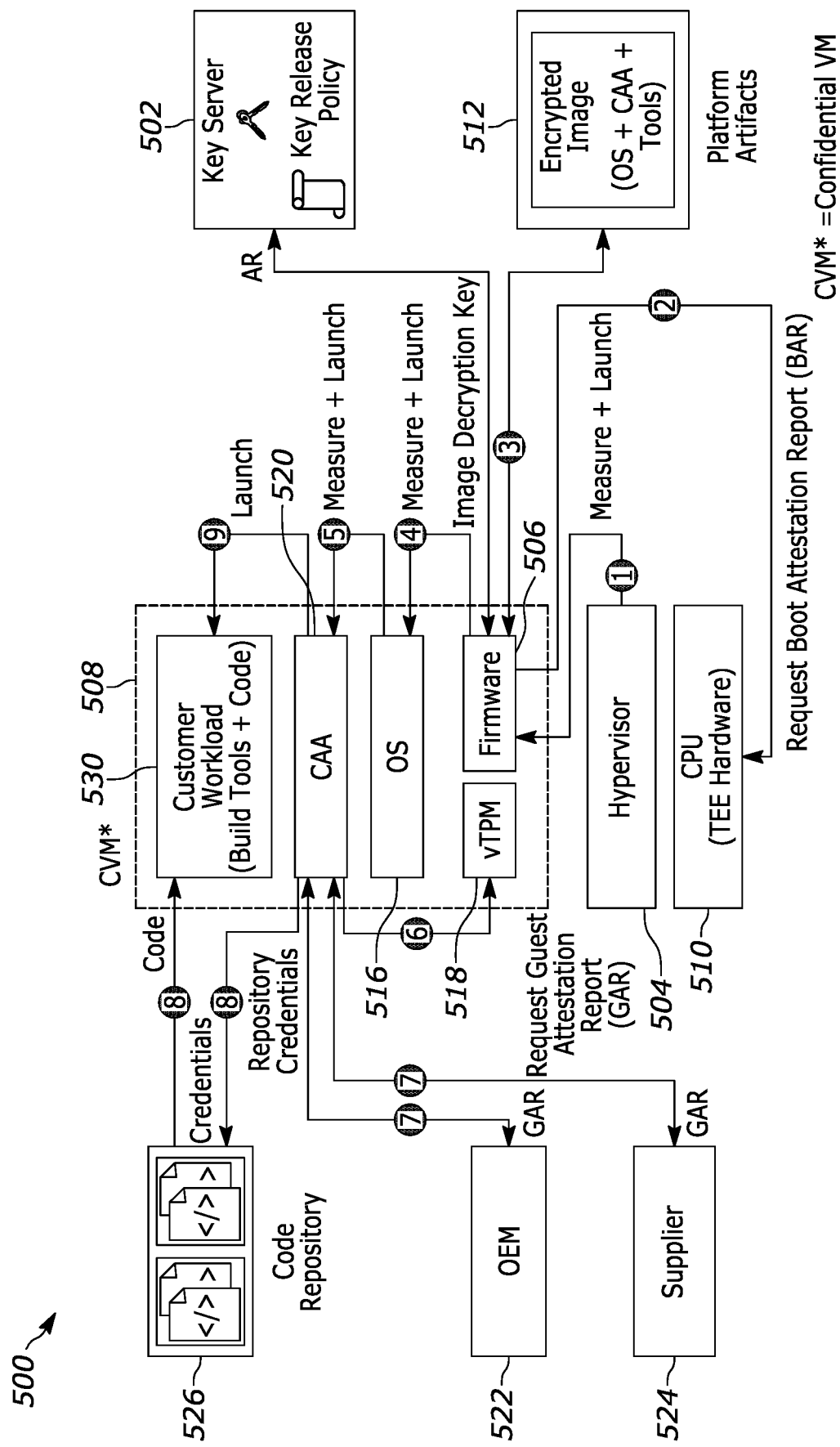
FIG. 5 generally illustrates an example remote attestation and trusted launch process of a build process according to the principles of the present disclosure.

FIG. 5 generally illustrates an example remote attestation and trusted launch process 500 of a build process (e.g., as executed at least in part in a cloud computing system). It may be assumed that before the process is initiated, a customer has uploaded the encrypted and integrity-protected build server software image to the cloud computing system (and/or one of the setup options described herein have been executed) along with encryption/integrity protection key(s) and a key release policy to a key management server 502. The process may be initiated by a cloud orchestration server when a request for launching a VM is made by the CI/CD server as described above.

A hypervisor 504 launches firmware 506 of a VM 508 (e.g., a confidential virtual machine, or CVM) as shown at (1) and requests TEE hardware (e.g., CPU 510) to measure the firmware 506 and store the measurement in a corresponding register of the CPU 510. The firmware 506 requests a boot attestation report (BAR) from the CPU 510 as shown at (2). The BAR contains the measurement of the firmware 506 and is signed by an attestation key (AK) protected in the TEE hardware.

The firmware 506 delivers the BAR to the key management server 502. If the contents of the signed attestation report (type of platform TEE, measurement of the firmware 506, etc.) satisfy the key release policy of the customer, the disk image decryption key is securely delivered (e.g., from a platform artifacts server 512) to the firmware 506 as shown at (3). The key is wrapped using a hardware public key, whose private key counterpart is only available to the CPU 510.

The VM firmware 506 decrypts the encrypted image downloaded from the platform artifacts server 512 (e.g. with assistance received from the CPU 510), verifies the integrity of the disk image, starts a secure boot process, and loads an operating system (OS) 516 into memory as shown at (4). The OS code and data pages in memory are measured by a virtual TPM (vTPM) 518 that runs at the level of the VM firmware 506.

Once the OS 516 is loaded, it launches a Customer Attestation Agent (CAA) 520 as shown at (5), which is part of the platform image built by the customer. The CAA 520 is configured to perform remote attestation to developer entities (e.g., an OEM 522 and supplier 524) in order to obtain the security credentials that will be used to download the source code and build configuration from code repositories 526. The OS 516 also requests the vTPM 518 to record the measurement of the CAA 520 (e.g., into a register).

The CAA 520 requests a Guest Attestation Report (GAR) from the vTPM 518 as shown at (6). The GAR contains the measurement of the OS 516 and the CAA 520 of the VM 508, along with an ephemeral key that can be used to encrypt secrets that can only be decrypted by the vTPM 518. The GAR is signed by the private attestation key of the vTPM 518.

As shown at (7), the CAA 520 transmits the GAR to all the entities from which the repository access credentials must be obtained in order to download the source code onto a build server 530. After verifying the GAR of the vTPM 518, the developer entities encrypt the repository access credentials using the encryption key of the vTPM 518 (as obtained from the GAR) and deliver the encrypted credentials to the CAA 520.

As shown at (8), the CAA 520 launches the build process with the access credentials on the build server 530 and the build process downloads the source code and configuration files for the build from the code repositories 526.

The build is executed on the build server 530 as shown at (9). The runtime network configuration of the system (firewall rules, open ports, etc.) ensures that it is not possible to either access the hardware machine executing the VM 508 remotely or exfiltrate data out of the machine during the build.

In some examples, remote attestation and trust launch functions may include a key derivation function, which may further include an alternative registration or trusted set-up process and remote attestation during trusted launch.

For the alternative registration or trusted setup process, the hypervisor 504 launches the firmware 506 of the VM 508 and requests the CPU 510 to measure the firmware 506 and store the measurement. The firmware 506 requests a boot attestation report (BAR) from the CPU 510. The BAR contains the measurement of the firmware 506 and is signed by an attestation key (AK) protected in hardware.

The firmware 506 then delivers the BAR to an attestation server. If the contents of the signed attestation report (type of platform TEE, measurement of firmware, etc.) can be verified by the attestation server, the attestation server securely delivers the seed used to generate the encryption and MAC verification keys (e.g., using the Key Derivation Function KDEV described above) to the TEE hardware. In one example, the attestation server delivers the seed by first setting up a secure channel, and, once the secure channel is established, communicating the seed. The full keys are then generated by the TEE hardware as described herein and these keys will be used to decrypt/authenticate the integrity of secrets in the disk image. This has the advantage that no additional communication is required of the BAR to the key management server 502 after this first set up step. The signed attestation report may be used as an additional-optional-string in the key derivation function. Including such a report would require that the attestation report be available during the set-up process. Including parts of the attestation report may also make the keys specific to the platform (e.g., the specific CPU being used). This could be achieved by including information uniquely stored in the CPU TEE. This process assumes that there is a way to set up trust between the platform, hypervisor 504, and VM 508 and the attestation service. This may be achieved via importing certificates to take ownership of the platform. Taking over ownership of the platform may be assumed to be performed in a secure environment.

In some examples, the attestation server delivers the seed using a specifically configured instruction, such as a LAUNCH_SECRET function.

Subsequent to delivering the BAR, the VM 508 is attested and the OS 516 is loaded. The OS 516 contains a running instance of the vTPM 518 as well and has access to the secret seed that was injected into the VM 508 (e.g., via the LAUNCH_SECRET instruction).

For the remote attestation during trusted launch, the hypervisor 504 launches the firmware 506 of the VM 508 and request the CPU 510 to measure the firmware 506 and store the measurement. The firmware 506 requests a boot attestation report (BAR) from the CPU 510. The BAR contains the measurement of the firmware 506 and is signed by an attestation key (AK) protected in hardware. The VM 508 is attested and the OS 516 is loaded. The OS 516 contains a running instance of the vTPM 518 as well, which already contains the secret seed that is needed to generate all keys from key derivation function.

Once the OS 516 is loaded, an application similar to the CAA 520 is launched, which is part of the platform image built by the customer and interfaces with the vTPM 518. The CAA 520 is configured to download the source code and build configuration from the repositories 526. However, in this example, no special credentials are required to access private infrastructure. Rather, the CAA 520 can download encrypted-authenticated source code directly from a public repository. An archive may contain all the source files needed to build the desired application. This is done from one or multiple website addresses to retrieve all the source code needed to build the application originating from the customer and the supplier. Accordingly, the source code may be included in the image in encrypted form. Only after injecting the secret seed would the source code be decrypted and authenticated and ready for use.

The CAA 520 then launches the build process and the build is executed on the build server 530. The runtime network configuration of the system (firewall rules, open ports, etc.) ensures that it is not possible to either access the machine remotely or exfiltrate data out of the machine during the build.

The registration or trusted set-up process and remote attestation during trusted launch techniques described above may be implemented with one or more variations to the examples described above. For example, as described above, the CAA 520 receives credentials that can be used to connect to the server containing source code (a code repository) to download the code onto the CVM and enable the build of the application. A variation to this approach is to request the repository to encrypt the code and send the encrypted code to the CVM for building. This has the advantage that the CVM does not actually have any access to the code repository server (and thus the infrastructure in which this server is hosted). Accordingly, the registration or trusted setup process and remote attestation during trusted launch procedure described could be modified as follows:

Subsequent to being loaded, the OS 516 launches the CAA 520, which is part of the platform image built by the customer. The CAA 520 is configured to perform remote attestation to the OEM and suppliers. If the attestation is successful, the OEM and suppliers send their encrypted code to the CAA 520 using a key agreed upon with the CAA 520. This can be done via transport layer security (TLS) or a similar protocol. The OS 516 also requests the vTPM 518 to record the measurement of the CAA 520 (e.g., into a corresponding register). The CAA 520 then requests a Guest Attestation Report (GAR) from the vTPM 518. The GAR contains the measurement of the OS 516 and the CAA 520, along with an ephemeral key that can be used to encrypt secrets that can only be decrypted by the vTPM 518. The GAR is signed by the private attestation key of the vTPM 518.

The CAA 520 transmits the GAR to all the entities from which encrypted source code to be sent to the build server 530 must be obtained. After verifying the GAR of the vTPM 518, the entities (OEM and suppliers) encrypt their code using a key agreed upon with the vTPM 518 (e.g., using TLS or a similar protocol) and send it to the CAA. The CAA 520 launches the build process after decrypting the code (with the help of the vTPM) on the build server 530. The build is then executed on the build server 530. The runtime network configuration of the system (firewall rules, open ports, etc.) ensures that it is not possible to either access the machine remotely or exfiltrate data out of the machine during the build.

As described in the above examples, the systems and methods of the present disclosure are configured to mitigate various security threats. For example, the network configuration of the build serer according to the principles of the present disclosure blocks all access to the build server to prevent unauthorized access. Further, secure boot and attestation techniques are used to prove to the customer that the intended workload will be launched on a trusted platform to eliminate MITM attacks to the launch build process.

As another example, the TEE on the build server prevents access to VM memory from privileged software (such as the hypervisor) and privileged system software to prevent exfiltration of source code from VM and theft of code repository access credentials from the VM. Further, the disk image is encrypted by the key of the customer, which is protected on a key management server and only released in accordance with the customer key release policy upon successful boot attestation to prevent vulnerabilities from being injected into the disk image of the build server. Use of the TEE, attestation, and access control policies described herein further prevent exploitation of vulnerabilities on the source code repositories for purposes of stealing source code.

Figure 6:
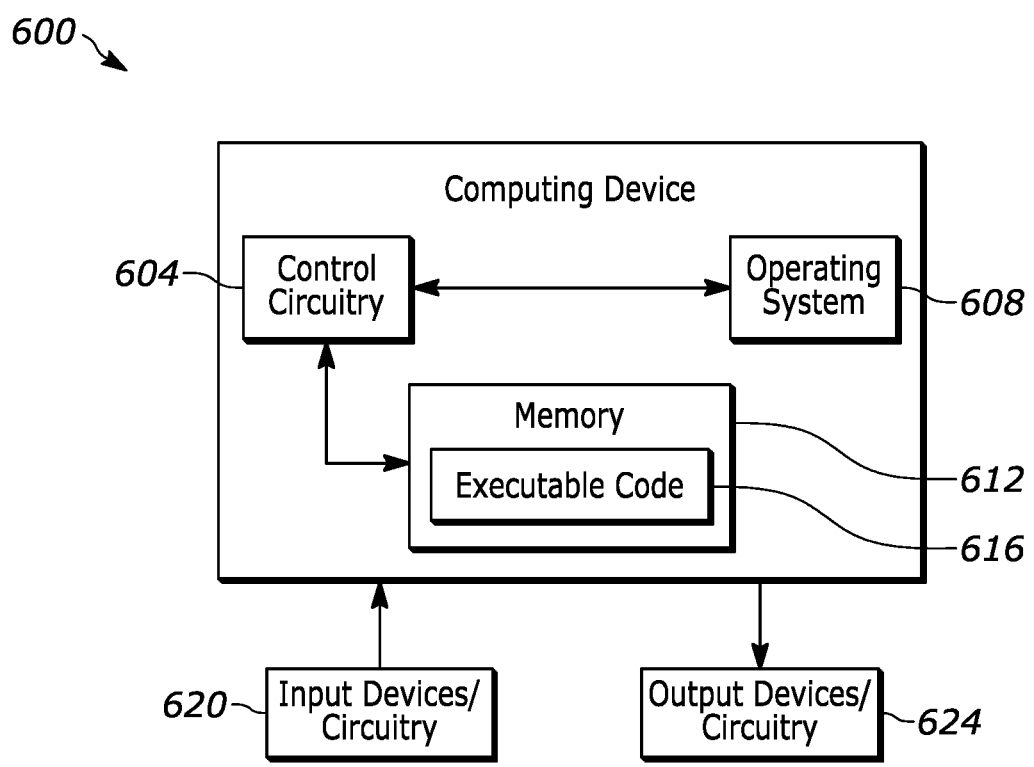
FIG. 6 shows a block diagram of an example computing device configured to implement functions of the systems and methods described herein.

FIG. 6 shows a block diagram of an example computing device 600 configured to implement functions of the systems and methods described herein according to the present disclosure. For example, one or more of the computing devices 600 may implement or be implemented by the one or more components of the system 300, the processes 400 and 500, etc. Systems described herein may implement a single computing device, a plurality of computing devices, etc., configured to individually and/or collectively perform functions related to the systems and methods of the present disclosure.

The computing device 600 may include control circuitry 604 that may be, for example, one or more processors or processing devices, a central processing unit processor (a, CPU, such as a CPU configured to operate in accordance with a TEE), an integrated circuit or any suitable computing or computational device, an operating system 608, a memory 612, executable code 616, input devices or circuitry 620, and output devices or circuitry 624. The control circuitry 604 (or one or more controllers or processors, possibly across multiple units or devices) may be configured to implement functions of the systems and methods described herein. More than one of the computing devices 600 may be included in, and one or more of the computing devices 600 may act as the components of, a system according to embodiments of the disclosure. Various components of the computing device 600 may be implemented with same or different circuitry, same or different processors or processing devices, etc.

The operating system 608 may be or may include any code segment (e.g., one similar to the executable code 616 described herein) designed and/or configured to perform tasks involving coordination, scheduling, arbitration, supervising, controlling or otherwise managing operation of the control circuitry 604 (e.g., scheduling execution of software programs or tasks or enabling software programs or other hardware modules or units to communicate). The operating system 608 may be a commercial operating system. The operating system 608 may be an optional component (e.g., in some embodiments, a system may include a computing device that does not require or include the operating system 608). For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

The memory 612 may be or may include, for example, Random Access Memory (RAM), read only memory (ROM), Dynamic RAM (DRAM), Synchronous DRAM (SD-RAM), a double data rate (DDR) memory chip, Flash memory, volatile memory, non-volatile memory, cache memory, a buffer, a short-term memory unit, a long-term memory unit, or other suitable memory units or storage units. The memory 612 may be or may include a plurality of memory units, which may correspond to same or different types of memory or memory circuitry. The memory 612 may be a computer or processor non-transitory readable medium, or a computer non-transitory storage medium, e.g., RAM.

The executable code 616 may be any executable code, e.g., an application, a program, a process, task, or script. The executable code 616 may be executed by the control circuitry 604, possibly under control of the operating system 608. Although, for the sake of clarity, a single item of the executable code 616 is shown, a system according to some embodiments of the disclosure may include a plurality of executable code segments similar to the executable code 616 that may be loaded into the memory 612 and cause the control circuitry 604 to carry out methods described herein. Where applicable, the terms "process" and "executable code" may be used interchangeably herein. For example, verification, validation and/or authentication of a process may mean verification, validation and/or authentication of executable code.

In some examples, the memory 612 may include non-volatile memory having the storage capacity of a storage system. In other examples, the computing device 600 may include or communicate with a storage system and/or database. Such a storage system may include, for example, flash memory, memory that is internal to, or embedded in, a micro controller or chip, a hard disk drive, a solid-state drive, a CD-Recordable (CD-R) drive, a Blu-ray disk (BD), a universal serial bus (USB) device or other suitable removable and/or fixed storage unit. Content may be stored in the storage system and loaded from the storage system into the memory 612 where it may be processed by the control circuitry 604.

The input circuitry 620 may be or may include any suitable input devices, components, or systems, e.g., physical sensors such as accelerometers, thermometers, microphones, analog to digital converters, etc., a detachable keyboard or keypad, a mouse, etc. The output circuitry 624 may include one or more (possibly detachable) displays or monitors, motors, servo motors, speakers and/or any other suitable output devices. Any applicable input/output (I/O) devices may be connected to the control circuitry 604. For example, a wired or wireless network interface card (NIC), a universal serial bus (USB) device, or external storage device may be included in the input circuitry 620 and/or the output circuitry 624. It will be recognized that any suitable number of input devices and output devices may be operatively connected to the control circuitry 604. For example, the input circuitry 620 and the output circuitry 624 may be used by a technician or engineer in order to connect to the control circuitry 604, update software, and the like.

Embodiments may include an article such as a computer or processor non-transitory readable medium, or a computer or processor non-transitory storage medium, such as for example memory, a disk drive, or USB flash memory, encoding, including or storing instructions (e.g., computer-executable instructions, which, when executed by a processor or controller, carry out methods disclosed herein), a storage medium such as the memory 612, computer-executable instructions such as the executable code 616, and a controller such as the control circuitry 604.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the disclosure may include components such as, but not limited to, a plurality of central processing units (CPU) or any other suitable multi-purpose or specific processors or controllers (e.g., controllers similar to the control circuitry 604), a plurality of input units, a plurality of output units, a plurality of memory units, and a plurality of storage units, etc. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on-board system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as the control circuitry 604.

Figure 7:
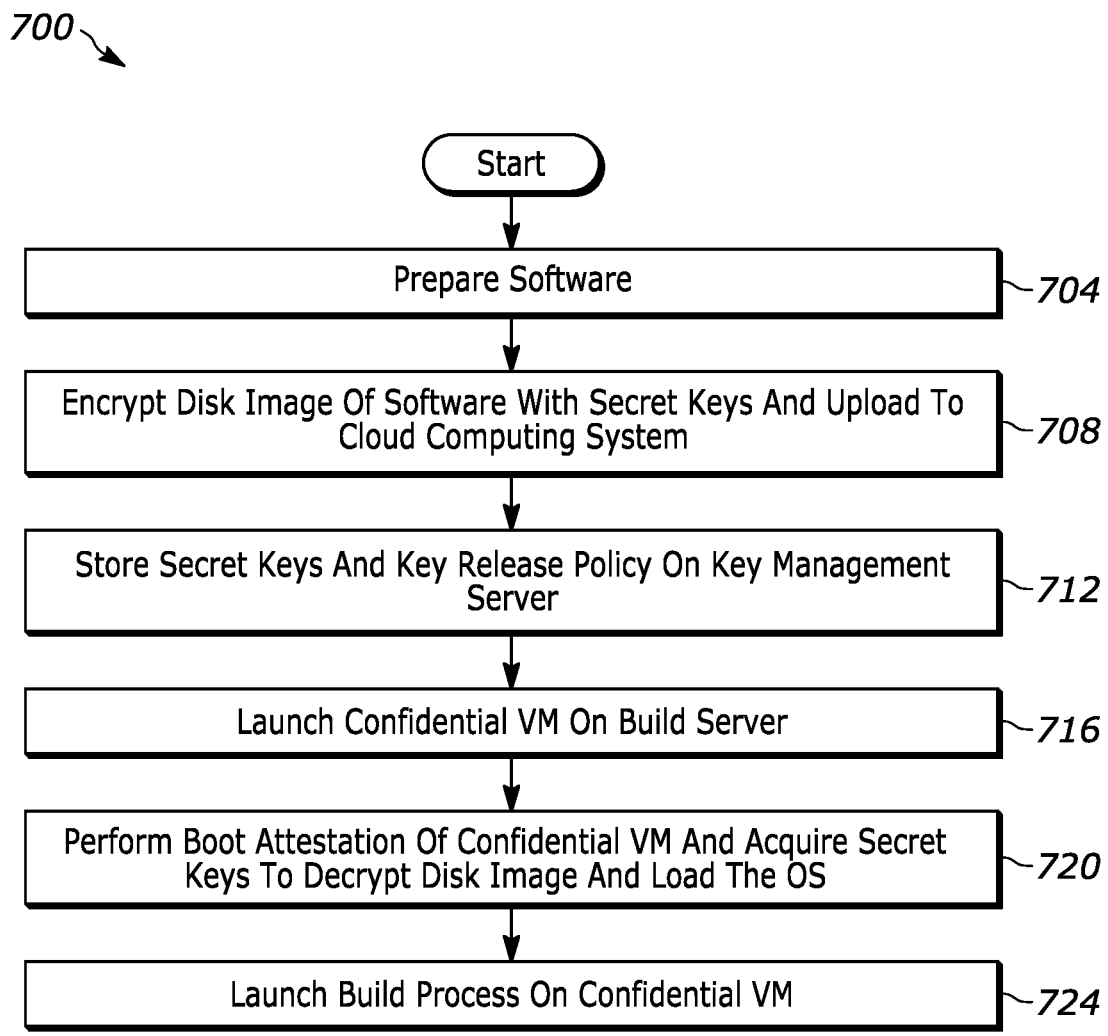
FIG. 7 illustrates steps of an example method for implementing a trusted, multi-party build using confidential computing according to the principles of the present disclosure.

FIG. 7 illustrates steps of an example method 700 for implementing a trusted, multi-party or multi-entity build using confidential computing according to the principles of the present disclosure. For example, one or more computing devices, processors or processing devices, etc. are configured to execute instructions to implement the method 700, such as one or more of the processors of the systems described herein.

At 704, software (e.g., software artifacts) that will run on a build server are prepared prior to being uploaded to a cloud computing system. At 708, a disk image of the software is encrypted and integrity-protected (e.g., by a build platform artifacts provider) using one or more secret keys and uploaded to the cloud computing system. At 712, one or more keys used to decrypt and verify the integrity of the image are securely stored (e.g., on a trusted key management server) along with a key release policy that defines one or more conditions under which the keys will be released to various entities.

At 716, the encrypted image is used (e.g., by an orchestration server) to launch a confidential VM on the build server (e.g., on a TEE platform implemented by the build server). For example, a hypervisor launches the firmware of the VM. At 720, boot attestation of the confidential VM is performed using one or more techniques described herein. For example, boot attestation is performed as described above in FIG. 5 and may include one or more of the variations described herein. The boot attestation is performed by acquiring the secret keys and using the secret keys in accordance with the key release policy. For example, the secret keys are used to decrypt the disk image and load the OS.

At 724, a trusted launch of the build process is performed on the confidential VM (e.g., using a CAA of the VM). The build process is launched as described above in FIG. 5 and may include one or more of the variations described herein.

After the build process is completed and launched (e.g., during and/or subsequent to 724), build artifacts are processed securely in the TEE prior to being transmitted to the multiple parties contributing code to the build process. The artifacts are encrypted and integrity protected and can be transmitted over the secure channel (e.g., negotiated between the server and the parties during remote attestation) between the trusted build server and the various parties, and/or saved on a storage device accessible to the parties over a secure channel. Similarly, if the build process terminates abnormally due to errors, the errors can be logged to the storage device and the parties can be notified accordingly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The various steps and logic performed herein can be executed with non-volatile storage, memory, and processors. Non-volatile storage may include one or more persistent data storage devices such as a hard drive, optical drive, tape drive, non-volatile solid-state device, cloud storage or any other device configured to persistently store information. Processor may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. Memory may include a single memory device or a number of memory devices including, but not limited to, random access memory (RAM), volatile memory, non-volatile memory, static random access memory (SRAM), dynamic random access memory (DRAM), flash memory, cache memory, or any other device configured to store information.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrases "at least one of A, B, and C" and "at least one of A, B, or C" should be construed to mean a logical (A OR B OR C), using a non-exclusive logical OR, and should not be construed to mean "at least one of A, at least one of B, and at least one of C."

The terms "a," "an," "the," and "said" as used herein in connection with any type of processing component configured to perform various functions may refer to one processing component configured to perform each and every function, or a plurality of processing components collectively configured to perform each of the various functions. By way of example, "A processor" configured to perform actions A, B, and C may refer to one or more processors configured to perform actions A, B, and C. In addition, "a processor" (or, "a processing device," "a computing device," and so on) configured to perform actions A, B, and C may also refer to a first processor configured to perform actions A and B, and a second processor configured to perform action C. Further, "A processor" configured to perform actions A, B, and C may also refer to a first processor configured to perform action A, a second processor configured to perform action B, and a third processor configured to perform action C.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

What is claimed is:

1. A method for implementing a multi-party software build process using confidential computing, the method comprising:
   encrypting, using one or more secret keys, a disk image of software configured to implement the software build process;
   storing the one or more secret keys and a key release policy, wherein the key release policy defines one or more conditions for releasing the one or more secret keys to entities associated with the software build process; and
   using hardware configured to support operation of a trusted execution environment (TEE),
      launching a software environment within the TEE and performing a cryptographic measurement of the software environment,
      selectively providing the one or more secret keys based on validation of the cryptographic measurement of the software environment and the key release policy, and
      using the one or more secret keys for decrypting the disk image, verifying integrity of the disk image, and launching the software build process.

2. The method of claim 1, wherein at least one of:
   the TEE is a process-based TEE comprising (i) hardware to support the process-based TEE and (ii) the cryptographic measurement of the software environment; and
   the method further comprises launching an isolated container configured to implement the software build process, wherein the isolated container is implemented using the hardware configured to support the operation of the TEE.

3. The method of claim 1, wherein the one or more secret keys include a first key associated with encrypting the disk image and a second key associated with verifying the integrity of the disk image.

4. The method of claim 1, wherein the one or more conditions defined by the key release policy identify one or more criteria for the TEE.

5. The method of claim 1, further comprising storing the one or more secret keys and the key release policy on a key management server.

6. The method of claim 5, further comprising performing boot attestation by generating a boot attestation report and providing the boot attestation report to the key management server.

7. The method of claim 6, further comprising releasing the one or more secret keys from the key management server to a virtual machine based on the boot attestation report and the key release policy.

8. The method of claim 1, wherein launching the software build process includes launching an operating system (OS) and a customer attestation agent (CAA), the method further comprising obtaining a measurement of the OS and the CAA and obtaining, from respective entities based on results of the measurement of the OS and the CAA, build artifacts and configuration information for the software build process.

9. The method of claim 8, wherein the software build process is configured to implement functions to isolate different steps of the software build process.

10. The method of claim 1, further comprising at least one of:
    at a software agent, processing build artifacts in the TEE and transmitting the build artifacts to the entities subsequent to completing the software build process; and
    filtering an output of the software build process to remove source code relevant data and transmitting the filtered output to entities that provided source code for the software build process.

11. The method of claim 10, wherein the software agent is configured to (i) encrypt and protect integrity of the build artifacts using a plurality of keys and (ii) transmit the build artifacts to the entities that provided the source code.

12. The method of claim 1, further comprising receiving, from a repository, encrypted build artifacts and configuration information for the software build process and decrypting, at a virtual machine configured to implement the software build process, the encrypted build artifacts and configuration information.

13. The method of claim 11, further comprising (i) sending a second party measurement of the software environment and (ii) upon validation of the second party measurement, receiving, from a second party, a decryption key for the encrypted build artifacts and configuration information.

14. A system configured to implement a multi-party software build process using confidential computing, the system comprising:
    a build artifacts platform provider configured to encrypt, using one or more secret keys, a disk image of software configured to implement a software build process;
    a key management server configured to store the one or more secret keys and a key release policy, wherein the key release policy defines one or more conditions for releasing the one or more secret keys to entities associated with the software build process; and
    a computing device configured to implement the software build process, wherein the computing device includes hardware configured to support operation of a trusted execution environment (TEE), wherein
       the computing device is configured to launch a software environment within the TEE and perform a cryptographic measurement of the software environment,
       the key management server is configured to selectively provide the one or more secret keys to the computing device based on validation of the cryptographic measurement of the software environment and the key release policy, and the computing device is configured to, using the one or more secret keys for decrypting the disk image, verify integrity of the disk image and launch the software build process.

15. The system of claim 14, wherein at least one of:
the TEE is a process-based TEE comprising (i) hardware to support the process-based TEE and (ii) the cryptographic measurement of the software environment; and
the computing device is configured to launch an isolated container configured to implement the software build process, wherein the isolated container is implemented using the hardware configured to support the operation of the TEE.

16. The system of claim 14, wherein the computing device is configured to, subsequent to completing the software build process, process build artifacts in the TEE and transmit the build artifacts to the entities.

17. The system of claim 14, wherein at least one of:
the one or more secret keys include a first key associated with encrypting the disk image and a second key associated with verifying integrity of the disk image;
the one or more conditions defined by the key release policy identify one or more criteria for the TEE; and
boot attestation is performed by generating a boot attestation report and providing the boot attestation report to the key management server.

18. The system of claim 14, wherein the key management server is configured to release the one or more secret keys to a virtual machine based on a boot attestation report and the key release policy.

19. The system of claim 14, wherein at least one of:
the disk image is prepared using a key derivation function based on (i) a hash of contents of the disk image and (ii) a secret seed; and
the computing device is configured to receive, from a repository, encrypted source code for the software build process and decrypt, at a virtual machine configured to implement the software build process, the encrypted source code.

20. A system configured to implement a multi-party software build process using confidential computing, the system including a processing device configured to execute instructions stored in memory to:
encrypt, using one or more secret keys, a disk image of software configured to implement the software build process;
store the one or more secret keys and a key release policy, wherein the key release policy defines one or more conditions for releasing the one or more secret keys to entities associated with the software build process; and
using hardware configured to support operation of a trusted execution environment (TEE), implement the software build process, launch a software environment within the TEE and perform a cryptographic measurement of the software environment, selectively provide the one or more secret keys based on validation of the cryptographic measurement and the key release policy, and, using the one or more secret keys for decrypting the disk image, verify integrity of the disk image and launch the software build process.

* * * * *